(12) United States Patent  
Chrestenson

(10) Patent No.: US 8,011,606 B1  
(45) Date of Patent: Sep. 6, 2011

(54) PORTABLE SYSTEM AND METHOD FOR SEPARATING AND RECYCLING GYPSUM AND NON-FERROUS WASTE DISCHARGE FROM A STEADY STREAM OF COMMINUTED GYPSUM WALLBOARD

(76) Inventor: Robert A. Chrestenson, Brentwood, CA (US)

( * ) Notice: Subject to any disclaimer, the term of this patent is extended or adjusted under 35 U.S.C. 154(b) by 115 days.

(21) Appl. No.: 12/237,210

(22) Filed: Sep. 24, 2008

(51) Int. Cl.
*B02C 21/02* (2006.01)

(52) U.S. Cl. ............... 241/24.12; 241/24.19; 241/79; 241/101.76

(58) Field of Classification Search ............... 241/24.19, 241/24.12, 24.29, 101.76, 79, 79.2, 79.3, 241/74
See application file for complete search history.

(56) References Cited

U.S. PATENT DOCUMENTS

| 4,018,675 | A | * | 4/1977 | Petrucci ............... 209/44.2 |
| 4,420,390 | A | | 12/1983 | Carr |
| 4,634,060 | A | | 1/1987 | Riemann et al. |
| 4,801,101 | A | | 1/1989 | Dreyer et al. |
| 4,807,817 | A | | 2/1989 | Schoewe |
| 4,815,667 | A | | 3/1989 | Keller |
| 4,896,836 | A | | 1/1990 | Mitchell |
| 5,183,213 | A | | 2/1993 | Knez, Jr. |
| 5,238,195 | A | | 8/1993 | Knez, Jr. |
| 5,452,860 | A | | 9/1995 | Williams |
| 5,593,096 | A | | 1/1997 | Harker et al. |
| 5,630,556 | A | | 5/1997 | Chrestenson |
| 6,164,572 | A | | 12/2000 | Tudahl et al. |
| 6,739,532 | B2 | | 5/2004 | McCamley |
| 7,073,736 | B2 | | 7/2006 | Takahashi |

FOREIGN PATENT DOCUMENTS

JP  2002254032  *  9/2002

* cited by examiner

*Primary Examiner* — Mark Rosenbaum
(74) *Attorney, Agent, or Firm* — Charles L. Thoeming

(57) ABSTRACT

System and method for comminuting gypsum wallboard received from a series of processing hoppers and milling hoppers by discharge into an assembly including a feed hopper, a barrel and trommel screen assembly for separation and final removal of paper and non-ferrous materials from comminuted gypsum wallboard, and separate assembly for receiving and conveying processed barrel screen discharge waste and gypsum.

17 Claims, 5 Drawing Sheets

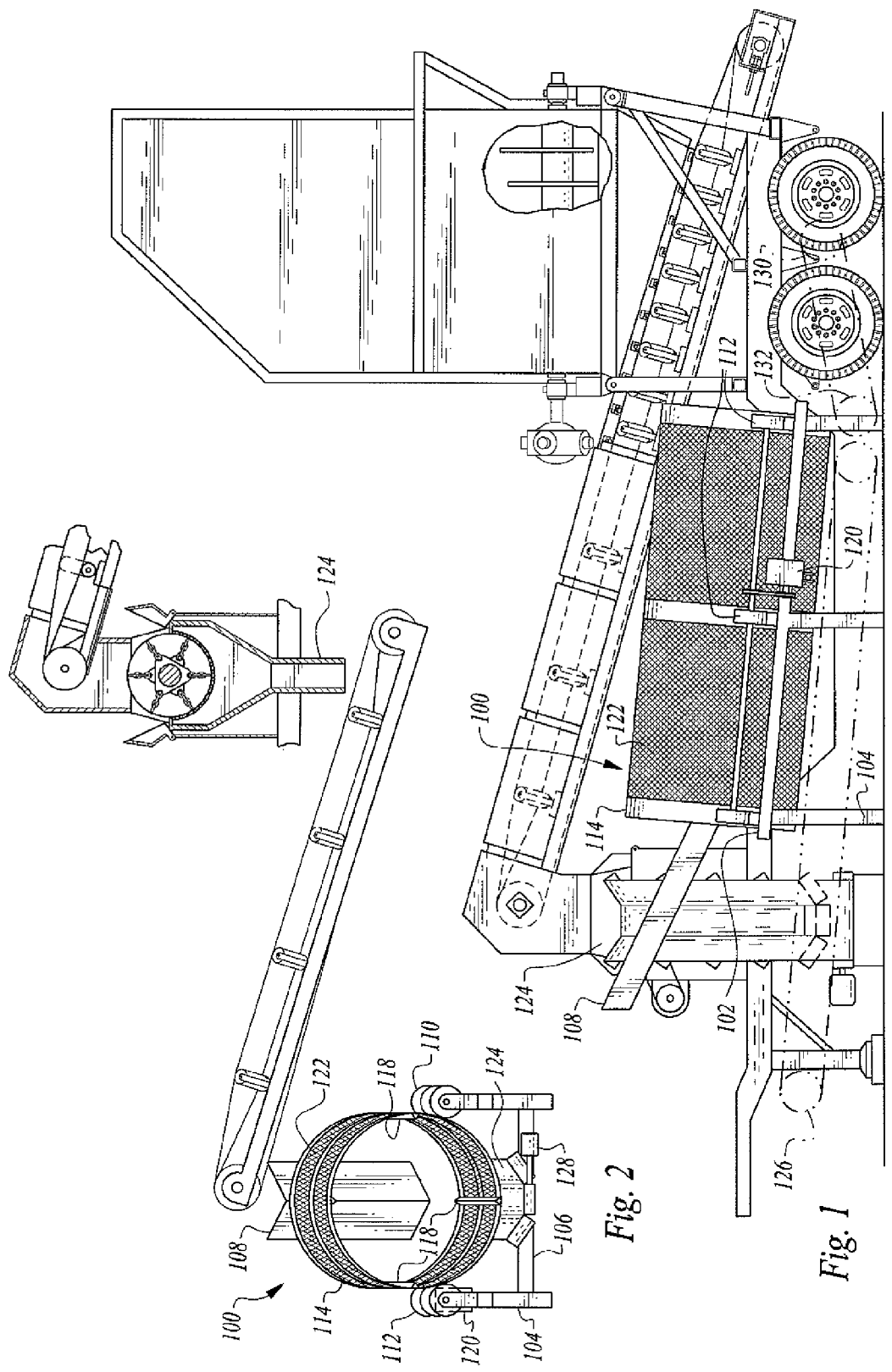

PORTABLE SYSTEM AND METHOD FOR SEPARATING AND RECYCLING GYPSUM AND NON-FERROUS WASTE DISCHARGE FROM A STEADY STREAM OF COMMINUTED GYPSUM WALLBOARD

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates generally to portable apparatus which readily can be conveyed from site to site and utilized to comminute or pulverize gypsum wallboard for recycling, and in particular, to a system and method for improved separation and final removal of paper and non-ferrous materials from the comminuted gypsum wallboard.

BACKGROUND OF THE INVENTION

The following Patents or Patent Publications are believed to be representative of the art: U.S. Pat. No. 5,630,556, issued May 20, 1997; U.S. Pat. No. 6,739,532, issued May 25, 2004; U.S. Pat. No. 6,164,572, issued Dec. 26, 2000; U.S. Pat. No. 5,238,195, issued Aug. 24, 1993; U.S. Pat. No. 5,183,213, issued Feb. 2, 1993; U.S. Pat. No. 5,593,096, issued Jan. 14, 1997; U.S. Pat. No. 4,807,817, issued Feb. 28, 1989; U.S. Pat. No. 7,073,736, issued Jul. 11, 2006; U.S. Pat. No. 4,896,836, issued Jan. 30, 1990; U.S. Pat. No. 4,815,667, issued Mar. 28, 1989; U.S. Pat. No. 4,634,060, issued Jan. 6, 1987; U.S. Pat. No. 4,801,101, issued Jan. 31, 1989; U.S. Pat. No. 5,452,860, issued Sep. 26, 1995; and U.S. Pat. No. 4,420,390, issued Dec. 13, 1983.

My portable apparatus for comminuting gypsum wallboard as described and claimed in U.S. Letters Patent 5,630,556 (the "'556 Patent") is incorporated herein by reference for all purposes. A preferred embodiment of system and method for improved separation and final removal of paper and non-ferrous materials from the comminuted gypsum wallboard disclosed in this application is suitable for integration into the apparatus of the '556 Patent to receive material discharged from the chain mill [FIG. 5 of the '556 Patent]. It will be understood, however, that the system and method for improved separation and final removal of paper and non-ferrous materials from the comminuted gypsum wallboard disclosed in this application is equally applicable to systems lacking any final stage capability to separate non-ferrous waste from comminuted gypsum wallboard.

BRIEF SUMMARY OF THE INVENTION

Disposal of scrap and waste wallboard material poses many challenges, from environmental concerns to economies of scale. The principal objective to maximize recovery and recycling of scrap or waste wallboard material is separation of paper from the gypsum board.

An improved portable system and apparatus for comminuting gypsum wallboard of the '566 Patent includes: 1) a first hopper having a plurality of rotary milling units, each unit including an elongated shaft with each shaft having tines with distal ends projecting outward from the shaft, whereby milling tines of adjacent milling units intermesh forming numerous restricted passageways; 2) means for receiving and conveying first hopper discharge; 3) a second hopper for receiving first hopper discharge and having means for further comminuting the wallboard, magnetic means for separating ferrous metal material from the wallboard particles, and means for collecting non-ferrous metals and waste from the comminuted gypsum wallboard within the second hopper; and 4) means for receiving and conveying second hopper discharge.

In a preferred embodiment of the system and method for separation and final removal of paper and non-ferrous materials (waste) from the comminuted gypsum includes a revolving barrel trommel screen assembly of the third hopper for separation and final removal of paper and non-ferrous materials (waste) from the comminuted gypsum. It is appreciated that the '566 Patent generally shows the component configuration of the other two hoppers and connecting belts. Added to the '566 Patent is a third hopper for receiving relatively high volume system throughput rates of second hopper discharge and delivering the second hopper discharge into a revolving barrel trommel screen assembly for separation and final removal of paper and non-ferrous materials from the comminuted gypsum wallboard, and separate assemblies for receiving and conveying barrel screen discharge waste and gypsum.

An embodiment of a revolving barrel trommel screen assembly for separation and final removal of paper and non-ferrous materials from the comminuted gypsum wallboard, and separate assemblies for receiving and conveying barrel screen discharge waste and gypsum at a high volume system throughput rates, is disclosed and provided as a stand alone component for finished treatment in waste wallboard recycling systems lacking such capabilities.

It is, therefore, one object to provide a new and useful system and method to separate paper and other non-ferrous waste from pulverized gypsum board.

A further object is to provide a cost effective system and method to separate paper and other non-ferrous waste from pulverized gypsum board.

It is yet another object to provide a universal system and method to separate paper and other non-ferrous waste from pulverized gypsum board which may either be a stand alone, portable unit or a component of an entire gypsum wallboard comminuting system or apparatus, such as the '566 Patent.

It is a further object to provide an inexpensive system and method to separate paper and other non-ferrous waste from pulverized gypsum board.

It is yet a further object to provide a system and method to separate paper and other non-ferrous waste from pulverized gypsum board which can match high volume throughput rates of an entire gypsum wallboard comminuting system or apparatus, such as the '566 Patent.

A system and method for improved separation and final removal of paper and non-ferrous waste material from gypsum wallboard is thus adapted for entire gypsum wallboard comminuting system or apparatus. In its broad form, this system and method can be portable or fixed. Embodiments are suitable as a stand alone system and method for final removal of high throughput volumes of paper and non-ferrous waste material from comminuted gypsum wallboard.

In a preferred embodiment, the system and method is adapted to the '556 Patent.

Related features, objects and advantages of the present invention will be apparent with reference to the following description and accompanying drawings.

BRIEF DESCRIPTION OF DRAWINGS

FIG. 1 is right side elevation view of apparatus constructed in accordance with the teaching of the system and method to separate paper and other non-ferrous waste from pulverized gypsum board.

FIG. 2 is a partial back end view of apparatus constructed in accordance with the teaching of the system and method to separate paper and other non-ferrous waste from pulverized gypsum board.

DETAILED DESCRIPTION OF THE INVENTION

Figure 3:
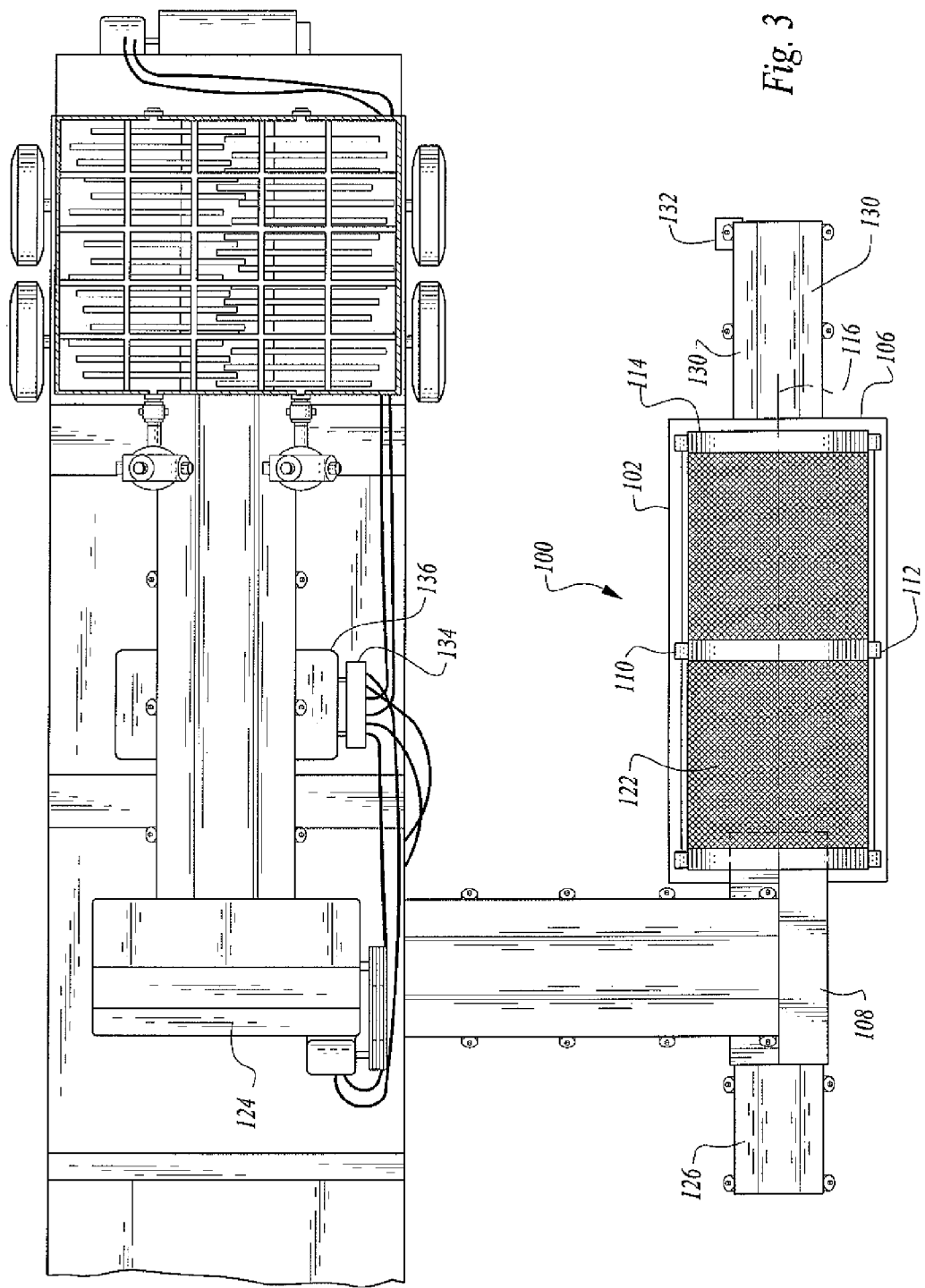
FIG. 3 is a partial top plan view of apparatus constructed in accordance with the teaching of the system and method to separate paper and other non-ferrous waste from pulverized gypsum board.
Figure 4:
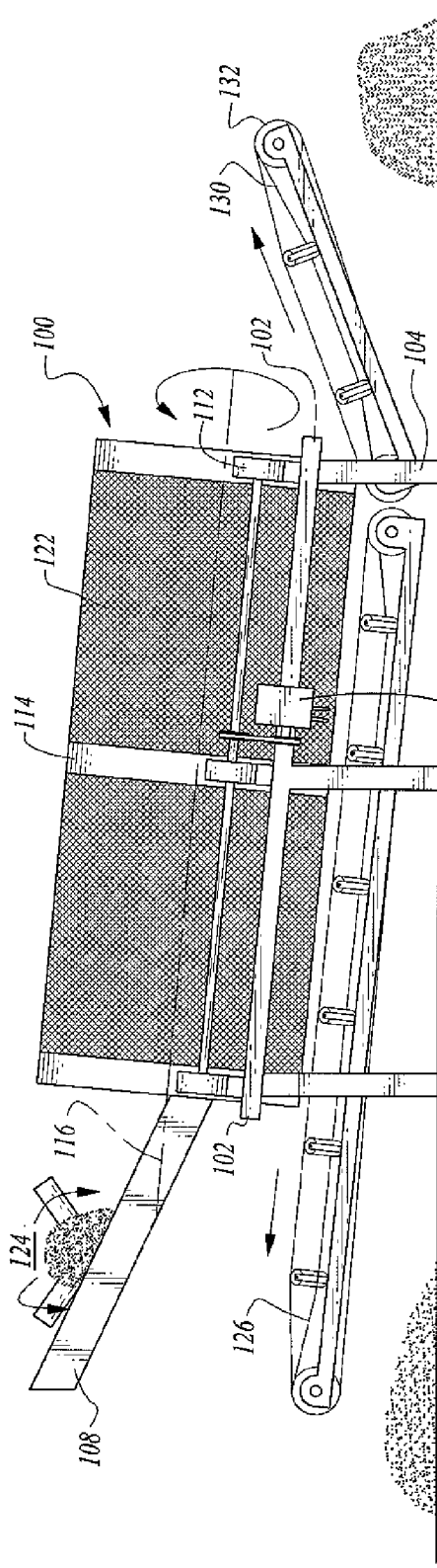
FIG. 4 is a side elevation view of apparatus constructed in accordance with the teaching of the system and method to separate paper and other non-ferrous waste from pulverized gypsum board.
Figure 5:
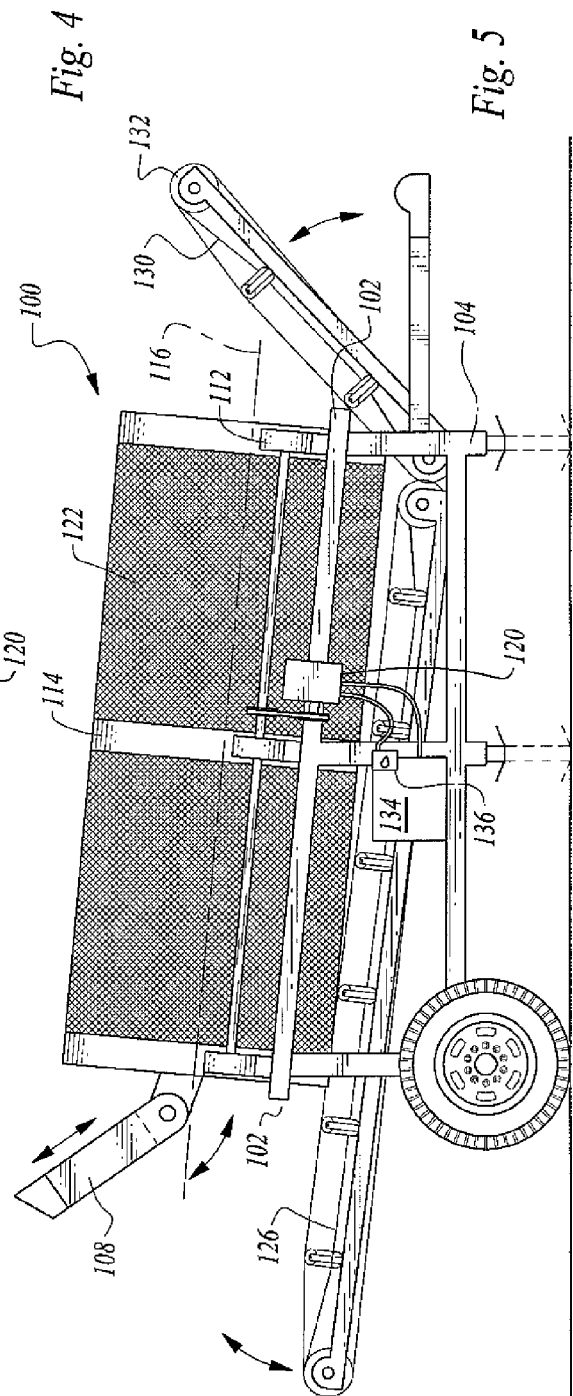
FIG. 5 is a side elevation view of a stand alone embodiment apparatus constructed in accordance with the teaching of the system and method to separate paper and other non-ferrous waste from pulverized gypsum board.

With reference to the drawings, an embodiment of a system and method for improved separation and final removal of paper and non-ferrous waste material from the comminuted gypsum is disclosed, FIGS. 1-7.

The portable system 100 for comminuting gypsum wallboard includes a unitary, rigid frame having a set of parallel inclined upper rails 102 running substantially the length of the frame. Legs 104 each having two ends, with one end of each leg attached to and supporting the frame inclined upper rails 102 in an acute angle upward from a generally flat surface. This assembly provides a substantially frame high end and a frame low end. Cross members 106 provide stability and support to the legs 104 and frame inclined upper rails 102. Driving rollers 112 and carrier rollers 110 are rotatably attached to the upper rails 102 and evenly spaced along the upper rails 102. A rotating cylindrical drum assembly 114 is mounted for rotational movement on top of the frame rails 102, communicating with the driving rollers 112 and carrier rollers 110. The drum assembly 114 defines a cylindrical drum longitudinal centerline 116 and a substantially uniform drum diameter.

An embodiment of the system provides a drum assembly 114 having a five foot diameter and a sixteen foot length. A preferred embodiment of the system provides a drum assembly 114 having a five foot diameter and a thirty foot length.

In the preferred embodiment, the drum assembly 114 includes an open end at the frame high end of the drum assembly with a feed hopper provided by the apparatus of the '556 Patent. In an alternate embodiment, the drum assembly 114 includes an open end at the frame high end of the drum assembly with a feed hopper 108 supported by the frame into the open end. The drum assembly 114 further includes an open end at the frame low end.

At least one cylindrical trommel screen assembly 122 is fixedly mounted within the drum assembly, each trommel screen assembly sized to fit symmetrically about the drum longitudinal centerline and rotatably turn with the drum assembly 114. At least one gypsum discharge hopper 124 is attached to the frame in a position substantially parallel to the longitudinal centerline 116 below the at least one trommel screen 122. A first conveyor assembly 126 for receiving trommel screen 122 gypsum discharge is mounted on the frame below each gypsum discharge hopper 124. A second conveyor assembly 130 for receiving non-ferrous waste discharge is mounted on the frame below the frame low end drum assembly. A drum drive motor 120 is included on the frame for driving the drum assembly 122. A first conveyor drive motor 128 is included on the frame for driving the first conveyor assembly 126. A second conveyor drive motor 132 is included on the frame for driving the second conveyor assembly 130.

An embodiment of the trommel screen 122 includes a uniform screen mesh size of $5/32$ of an inch. An alternate embodiment of the trommel screen 122 includes a uniform screen mesh size of $3/16$ of an inch. Trammel screen mesh size can range from $1/8$ of an inch to one inch, depending upon the upstream comminuting system efficiency and processing. The trommel screen 122 is detachable from the drum assembly 114 for changing the screen mesh size as may be required by the comminuted gypsum feedstock. The preferred screen mesh of the trommel screen 122 is stainless steel.

The portable system 100 includes at least two internal spines 118 affixed to the drum assembly 114 substantially parallel to the drum longitudinal centerline 116 the length of the drum assembly 114, spaced at equal angles about the centerline 116, and having substantially uniform widths projecting radially into the drum assembly 114 and trommel screen 122 interiors along at uniform lengths.

A preferred embodiment of the portable system 100 has four spines 118, each spine spaced at ninety degrees from its adjacent spines about the drum longitudinal centerline 116.

The first conveyor drive assembly 126 and second conveyor drive assembly 130 each include a hydraulic drive motor, 128 and 132 respectively, the hydraulic motors 128 and 132 being in operative association with the source of pressurized fluid 134.

The first conveyor assembly 126 for receiving trommel screen gypsum discharge is disposed at an incline substantially parallel to the frame rails 102 for transporting gypsum discharge to a finished recycle collection point beyond the frame assembly high end.

The second conveyor assembly 130 for receiving non-ferrous waste discharge is disposed at an acute incline angle opposed to the frame inclined rails 102 for transporting non-ferrous waste to a waste collection point beyond the frame assembly low end.

An embodiment of the portable system 100 includes at least two wheels. For a preferred embodiment with wheels, each of two wheels is rotatably connected to a frame high end leg 104 end not attached to the frame, FIG. 5. In this manner the portable system 100 can be positioned as desired within a variety of gypsum processing or recycling systems.

In the preferred embodiment, a central source of pressurized hydraulic fluid and the prime-mover hydraulic pump combination for providing pressurized fluid to the drum drive motor 120 and the gypsum and waste conveyor drive motors, 128 and 132, respectively, are provided in the apparatus of the '556 Patent.

For an alternate embodiment, the drum drive motor 120 includes a central source of pressurized hydraulic fluid 134 and a prime mover driven pump 136 for providing pressurized fluid to the drum drive motor 120 and the gypsum and waste conveyor drive motors, 128 and 132, respectively.

Figure 6:
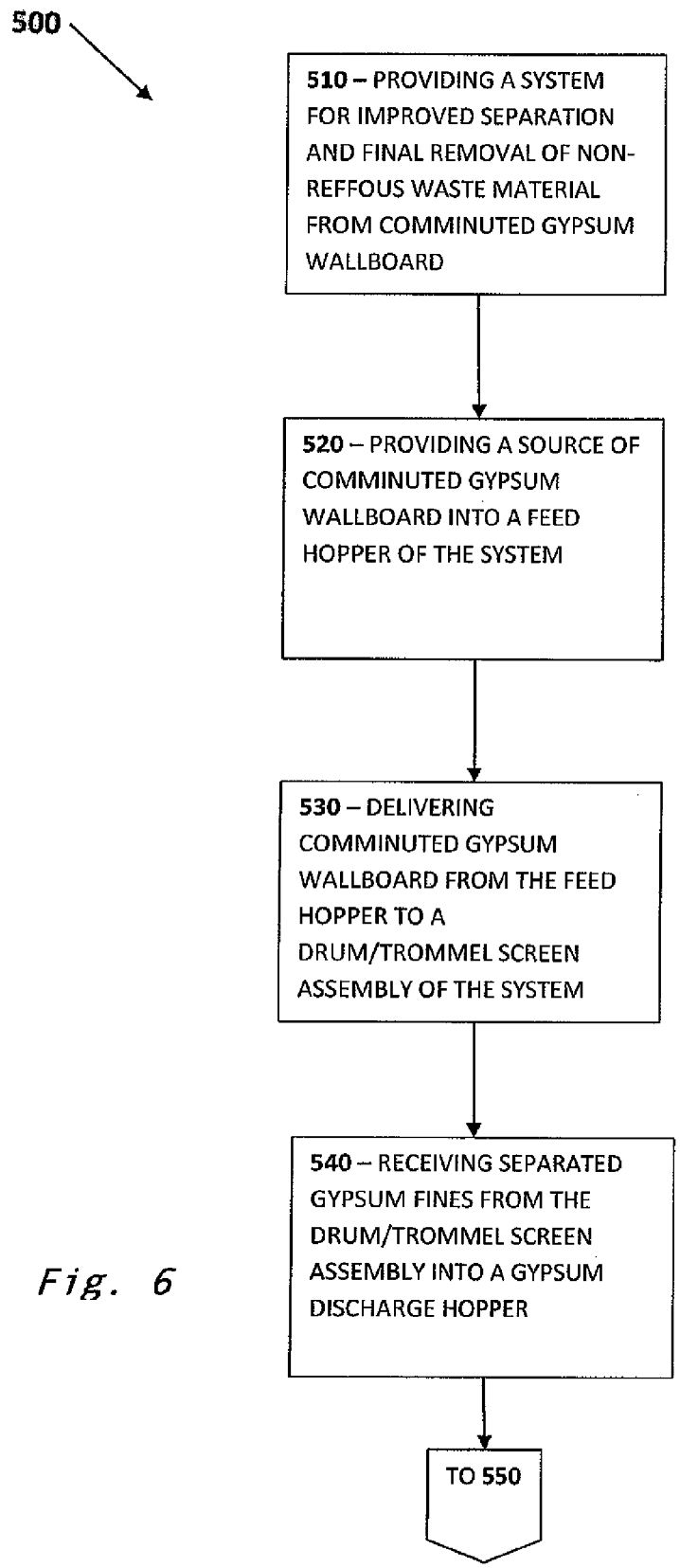
FIG. 6 is a flow chart depicting a portion of the method for improved separation and final removal of paper and non-ferrous waste material from the comminuted gypsum using the system depicted in FIGS. 1-4, either as a stand alone system or as a portion of the '566 Patent.
Figure 7:
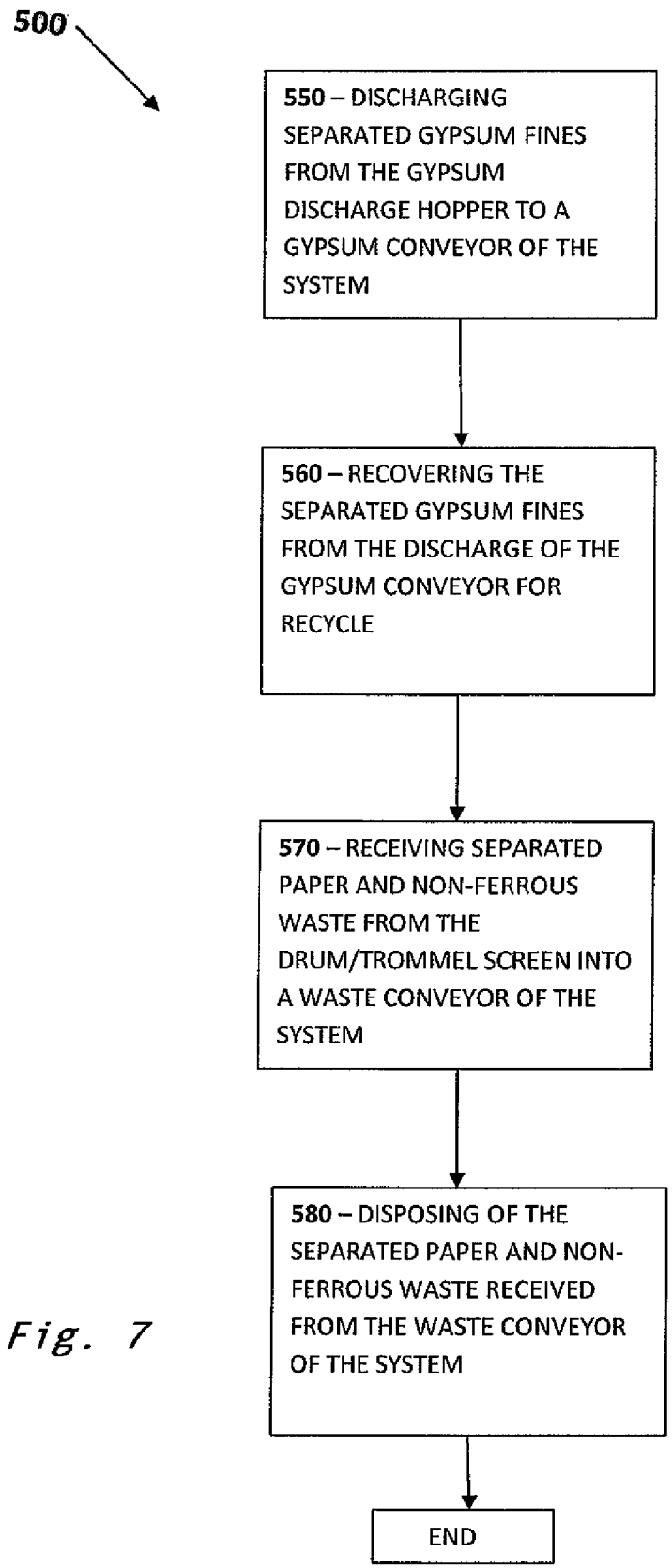
FIG. 7 is a flow chart depicting a portion of the method for improved separation and final removal of paper and non-ferrous waste material from the comminuted gypsum using the system depicted in FIGS. 1-4, either as a stand alone system or as a portion of the '566 Patent.

The method 500 for improved separation and final removal of paper and non-ferrous waste material from comminuted gypsum wallboard, FIGS. 6 and 7, includes the following steps:

a) 510 providing a system 100 for improved separation and final removal of paper and non-ferrous waste material from comminuted gypsum wallboard;

b) 520 providing a source of comminuted gypsum wallboard into a feed hopper 108 of the system 100;

c) 530 delivering the comminuted gypsum wallboard from the feed hopper 108 to an open end of a rotating drum 110 and trommel screen 122 assembly of the system 100;

d) 540 receiving separated gypsum fines from the rotating drum 110 and trommel screen 122 assembly of the system 100 into a gypsum discharge hopper 124 of the system 100;

e) 550 discharging the separated gypsum fines from the gypsum discharge hopper 124 to a gypsum conveyor 126 of the system 100;

f) 560 recovering the separated gypsum fines from the discharge of the gypsum conveyor 126 for recycle;

g) 570 receiving separated non-ferrous waste from the rotating drum 110 and trommel screen 122 assembly of the system 100 into a waste conveyor 130 of the system 100; and h) 580 disposing of the separated non-ferrous waste received from the waste conveyor 130.

As can be seen from the foregoing, the system and method for improved separation and final removal of paper and non-ferrous waste material can be installed and utilized as a stand alone system or as a component of an entire apparatus such as the '556 Patent. The preferred embodiment of the system and method can handle throughput rates of an entire gypsum wallboard comminuting system or apparatus, such as the '566 Patent, of 120 to 130 tons-per-hour.

For the purposes of promoting an understanding of the principles of the present invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the present invention as illustrated therein being contemplated as would normally occur to one skilled in the art to which the invention relates.

It should be understood that the invention is not intended to be limited by the specifics of the above-described embodiments, but rather by the accompanying claims.

I claim:

1. Portable system for separating and recycling gypsum and non-ferrous waste discharge from a steady stream of comminuted gypsum wallboard, the portable system comprising, in combination:

a) a unitary, rigid frame having a set of parallel inclined upper rails running substantially the length of the frame;

b) a plurality of legs each having two ends with one end of each leg attached to the frame for supporting the frame inclined rails in an acute angle upward from a generally flat surface providing a frame high end and a frame low end;

c) a plurality of frame and support leg cross members;

d) a plurality of driving rollers and carrier rollers rotatably attached to the upper rails and spaced along the upper rails;

e) a rotating cylindrical drum assembly mounted for rotational movement on top of the frame defining a cylindrical drum longitudinal centerline and a substantially uniform drum diameter and communicating with the driving rollers and carrier rollers, the drum assembly including an open end at the frame high end of the drum assembly with a feed hopper to receive a steady stream of comminuted gypsum wallboard into the open end, and an open end at the frame low end of the drum assembly;

f) at least one cylindrical trommel screen assembly fixedly mounted within the drum assembly, each trommel screen assembly sized to fit symmetrically about the drum longitudinal centerline and rotatably turn with the drum;

g) at least one gypsum discharge hopper attached to the frame along the longitudinal centerline below the at least one trommel screen;

h) first conveyor means for receiving trommel screen gypsum discharge mounted on the frame below each gypsum discharge hopper;

i) second conveyor means for receiving non-ferrous waste discharge mounted on the frame below the frame low end drum assembly;

j) drum drive means on the frame for driving the drum;

k) first conveyor drive means on the frame for driving the first conveyor means; and l) second conveyor drive means on the frame for driving the second conveyor means.

2. The portable system according to claim 1, further comprising at least two internal spines affixed to the drum substantially parallel to the drum longitudinal centerline the length of the drum, spaced at equal angles about the centerline, and having substantially uniform widths projecting radially into the drum and trommel screen interiors along at uniform lengths.

3. The portable system according to claim 2, comprising four spines spaced at ninety degrees about the drum longitudinal centerline.

4. The portable system according to claim 1, wherein drum drive means comprises at least one hydraulic motor, the system additionally comprising a source of pressurized fluid for providing pressurized fluid to at least one hydraulic motor.

5. The portable system according to claim 4, wherein the source of pressurized fluid includes a prime mover driven pump.

6. The portable system according to claim 4, wherein first conveyor drive means and second conveyor drive means each include a hydraulic drive motor, the hydraulic motors being in operative association with the source of pressurized fluid.

7. The portable system according to claim 1, wherein first conveyor means for receiving trommel screen gypsum discharge is disposed at an incline substantially parallel to the frame rails for transporting gypsum discharge to a finished recycle collection point beyond the frame high end.

8. The portable system according to claim 1, wherein second conveyor means for receiving non-ferrous waste discharge is disposed at an incline opposed to the frame inclined rails for transporting non-ferrous waste to a waste collection point beyond the frame low end.

9. The portable system according to claim 1, further comprising a plurality of wheels, one of which is rotatably connected to each leg end not attached to the frame.

10. The portable system according to claim 1, wherein the trommel screen size is between 1/8 inch and one inch.

11. Portable system for separating and recycling gypsum and non-ferrous waste discharge from a steady stream of comminuted gypsum wallboard, the portable system comprising, in combination:
 a) a monolithic frame assembly comprising at least four support legs, parallel support rails at an acute angle incline to a relatively level surface defining a frame upper end and a frame lower end, cross-member support elements, a feed hopper positioned at the frame upper end, and a gypsum discharge hopper positioned below the support rails substantially parallel to the acute angle incline of the rails and substantially as long as the rails;
 b) a plurality of driving rollers and carrier rollers rotatably attached to the upper rails and spaced along the parallel inclined support rails;
 c) a rotating cylindrical drum assembly mounted for rotational movement on the driving and carrier rollers defining a cylindrical drum longitudinal centerline, a substantially uniform drum diameter communicating with the driving rollers and carrier rollers, an open end at the frame upper end of the drum assembly, an open end at the frame low end of the drum assembly, and at least one cylindrical trommel screen assembly fixedly mounted within the drum assembly, each trommel screen assembly sized to fit symmetrically about the drum longitudinal centerline and rotatably turn with the drum;
 d) first conveyor means for receiving trommel screen gypsum discharge mounted on the frame below the gypsum discharge hopper;
 e) second conveyor means for receiving non-ferrous waste discharge mounted on the frame below the frame lower end drum assembly and disposed at an incline opposed to the frame inclined rails for transporting non-ferrous waste to a waste collection point beyond the frame lower end;
 f) drum drive means on the frame for driving the drum;
 g) first conveyor drive means on the frame for driving the first conveyor means; and
 h) second conveyor drive means on the frame for driving the second conveyor means;
 whereby the feed hopper is positioned to receive a steady, high volume flow of comminuted gypsum wallboard consisting of gypsum and non-ferrous waste.

12. The portable system according to claim 1 wherein drum drive means comprises at least one hydraulic motor, the system additionally comprising a source of pressurized fluid for providing pressurized fluid to at least one hydraulic motor.

13. The portable system according to claim 12, wherein the source of pressurized fluid includes a prime mover driven pump.

14. The portable system according to claim 12, wherein first conveyor drive means and second conveyor drive means each include a hydraulic drive motor, the hydraulic motors being in operative association with the source of pressurized fluid.

15. An improved method of improved separating and recycling gypsum and non-ferrous waste discharge from a steady stream of comminuted gypsum wallboard, the method comprising the steps of:
 a) providing a system for improved separation and final removal of paper and non-ferrous waste material from comminuted gypsum wallboard;
 b) providing a steady stream source of comminuted gypsum wallboard into a feed hopper of the system for improved separation and final removal of paper and non-ferrous waste material from the steady stream source of comminuted gypsum wallboard;
 c) delivering the steady stream source of comminuted gypsum wallboard from the feed hopper to an open end of a rotating drum and trommel screen assembly of the system for improved separation and final removal of paper and non-ferrous waste material from comminuted gypsum wallboard;
 d) receiving separated gypsum fines from the rotating drum and trommel screen assembly of the system for improved separation and final removal of paper and non-ferrous waste material from comminuted gypsum wallboard into a gypsum discharge hopper of the system;
 e) discharging the separated gypsum fines from the gypsum discharge hopper to a gypsum conveyor of the system for improved separation and final removal of paper and non-ferrous waste material from comminuted gypsum wallboard;
 f) recovering the separated gypsum fines from the discharge of the gypsum conveyor for recycle;
 g) receiving separated non-ferrous waste from the rotating drum and trommel screen assembly of the system for improved separation and final removal of paper and non-ferrous waste material from comminuted gypsum wallboard into a waste conveyor of the system; and
 h) disposing of the separated non-ferrous waste received from the waste conveyor.

16. The method as defined in claim 15, wherein the rotating drum and trommel screen assembly of the system for improved separation and final removal of paper and non-ferrous waste material from comminuted gypsum wallboard comprises a screen size of approximately 5/32 of an inch.

17. The method as defined in claim 15, wherein the rotating drum and trommel screen assembly of the system for improved separation and final removal of paper and non-ferrous waste material from comminuted gypsum wallboard comprises a screen size of approximately 3/16 of an inch.

\* \* \* \* \*